(12) United States Patent
Pawar et al.

(10) Patent No.: US 10,397,965 B2
(45) Date of Patent: Aug. 27, 2019

(54) SYSTEM AND METHOD OF DETERMINING REAL-TIME LOCATION AND STATUS OF VOICE-OVER WI-FI (VOWIFI) USERS IN HETEROGENEOUS NETWORK ENVIRONMENT

(71) Applicant: RELIANCE JIO INFOCOMM LIMITED, Mumbai (IN)

(72) Inventors: Anil Pawar, Gurgaon (IN); Sagar Mishra, Berhampur (IN)

(73) Assignee: RELIANCE JIO INFOCOMM LIMITED, Mumbai, Maharashtra (IN)

(*) Notice: Subject to any disclaimer, the term of this patent is extended or adjusted under 35 U.S.C. 154(b) by 48 days.

(21) Appl. No.: 15/694,691

(22) Filed: Sep. 1, 2017

(65) Prior Publication Data
US 2018/0070390 A1    Mar. 8, 2018

(30) Foreign Application Priority Data

Sep. 5, 2016    (IN) .............................. 201621030296

(51) Int. Cl.
*H04W 76/02*    (2009.01)
*H04W 76/10*    (2018.01)
(Continued)

(52) U.S. Cl.
CPC .......... *H04W 76/10* (2018.02); *H04L 63/107* (2013.01); *H04L 67/306* (2013.01); *H04W 8/08* (2013.01); *H04W 12/08* (2013.01); *H04W 64/00* (2013.01); *H04W 8/183* (2013.01); *H04W 12/06* (2013.01); *H04W 48/04* (2013.01); *H04W 60/06* (2013.01); *H04W 84/12* (2013.01); *H04W 88/16* (2013.01)

(58) Field of Classification Search
CPC .... H04L 63/107; H04L 67/306; H04W 12/06; H04W 12/08; H04W 64/00; H04W 76/10; H04W 84/12; H04W 88/16; H04W 8/183; H04W 8/08
See application file for complete search history.

(56) References Cited

U.S. PATENT DOCUMENTS

| 10,043,016 B2* | 8/2018 | Wood ................... G06F 21/602 |
| 2008/0043771 A1* | 2/2008 | Cho .................... H04W 74/002 370/431 |

(Continued)

*Primary Examiner* — Mewale A Ambaye
(74) *Attorney, Agent, or Firm* — Ladas & Parry, LLP

(57) ABSTRACT

Embodiments of the present invention relate to systems and methods for restricting at least one service to a subscriber by receiving a connection request from a user equipment [102], wherein the connection request includes at least one of a UE identifier and a unique SIM identifier; generating one of a positive response and a negative response based on the connection request, wherein the positive response is generated in an event a user profile corresponding to the user equipment [102] is identified and the negative response is generated in an event the user profile corresponding to the user equipment [102] is not identified; and restricting the at least one service to the subscriber in an event, one of: the negative response is generated based on the connection request, a state information of a subscriber identity module (SIM) indicates detached, and a location area information of the SIM belongs to a forbidden list of areas.

11 Claims, 3 Drawing Sheets

(51) Int. Cl.
    *H04L 29/08*     (2006.01)
    *H04W 8/08*     (2009.01)
    *H04W 64/00*     (2009.01)
    *H04L 29/06*     (2006.01)
    *H04W 12/08*     (2009.01)
    *H04W 8/18*     (2009.01)
    *H04W 12/06*     (2009.01)
    *H04W 84/12*     (2009.01)
    *H04W 88/16*     (2009.01)
    *H04W 48/04*     (2009.01)
    *H04W 60/06*     (2009.01)

(56) References Cited

U.S. PATENT DOCUMENTS

2010/0215001 A1\* 8/2010 Russell ................ H04L 63/062
                                                                                                  370/329
2017/0164185 A1\* 6/2017 Betti .................... H04W 8/265

\* cited by examiner

SYSTEM AND METHOD OF DETERMINING REAL-TIME LOCATION AND STATUS OF VOICE-OVER WI-FI (VOWIFI) USERS IN HETEROGENEOUS NETWORK ENVIRONMENT

CROSS REFERENCE TO RELATED APPLICATION

This application claims the benefit of and priority to Indian Patent Application No: 201621030296 filed on Sep. 5, 2016, the disclosure of which is hereby incorporated herein by reference in its entirety.

TECHNICAL FIELD

Embodiments of the present invention generally relate to a heterogeneous wireless communication network. In particular, embodiments of the present invention relate to determining real-time location/status of voice-over Wi-Fi (VoWiFi) users in a cellular network to allow/restrict a VoWiFi service.

BACKGROUND

In a traditional cellular deployment, suitable powered macrocells are being deployed to cover sufficiently large areas to provide cellular network. However, with the deployment of macrocells only, it generally suffers with quick capacity degradation with the increase in number of user equipments operating in the macrocells coverage areas. As a result, telecom operators are placing one or more wireless access points (i.e. small cells) to provide Wi-Fi network at multiple strategic locations points along with the macrocells deployment to serve large number of user equipments operating in that particular location/area. This kind of network is generally termed as heterogeneous network (referred hereinafter as HetNet).

In the current scenario and with the advancement in the Wi-Fi technology, almost all available user equipments with cellular capability have now Wi-Fi capability to connect with the Wi-Fi network operating in either of the unlicensed frequency bands, 2.4 GHz, or 5 GHz. For the typical HetNet, strategic locations/areas for such small cells generally include areas with high density of user equipments such as shopping malls, airports, railway/bus stations, colleges, etc. Further, these locations might include area with dead-spots or areas with macrocells having low signal strength such as indoor establishments or peripheral locations of the macro coverage area. Therefore, the usage of such HetNet provides better network coverage and provides the increased data capacity that enhance the overall user's mobile broadband experience. Moreover, these HetNets are used by the user to avail services; one such service is a voice-over Wi-Fi (referred hereinafter as VoWiFi). The VoWiFi service is a complementary technology to voice-over long term evolution that utilizes internet-protocol (IP) multimedia subsystem technology to provide a packet-based voice service that is delivered to the user via the Wi-Fi network.

Currently, for availing the VoWiFi service, the user equipments access trusted Wi-Fi access points or an untrusted Wi-Fi access points. The trusted Wi-Fi access points are assumed to be an operator-built Wi-Fi access implementing encryption and using a secure authentication method. On the other hand, the untrusted Wi-Fi access points are considered to be an open and unsecured network as the cellular operators has no control over such access points. The untrusted Wi-Fi access points includes public hotspots, user's home Wi-Fi, a corporate Wi-Fi and any Wi-Fi access that does not provide sufficient security mechanisms such as authentication and encryption.

While the user equipments avail the VoWiFi service through any of the trusted Wi-Fi access points and the untrusted Wi-Fi access points, the cellular operator has obligation of lawful interception, wherein the operator has necessary obligation to provide real-time location of the user equipments within a telecom circle availing the VoWiFi service in any location. However, in current scenario, the cellular operators have only knowledge of public IP and port locations of the user equipments connected to the wireless access points, thereby making it difficult for the cellular operators to trace and block the user equipments in a particular circle in real time basis. Further challenge in the current scenario is to determine real-time location of the user equipments availing the VoWiFi service in national roaming or in an entire circle, wherein the users of the user equipments may be present in any location and cannot be barred only on the basis of the public IP and port location of the user equipments and thus, making difficult to restrict the VoWiFi users.

Therefore, in view of the above shortcomings in the existing approaches, there is a need in the art to efficiently and effectively determining real-time location of the user equipments and block/restrict the user equipments availing the VoWiFi service in the particular location/area or the entire circle.

SUMMARY

This section is provided to introduce certain aspects of the present invention in a simplified form that are further described below in the detailed description. This summary is not intended to identify the key features or the scope of the claimed subject matter.

Embodiments of the present invention may relate to a method of restricting at least one service to a subscriber based on a location area information, wherein the subscriber is associated with a unique SIM identifier of a subscriber identity module, the method comprising steps of: receiving a connection request from a user equipment, wherein the connection request includes at least one of a UE identifier associated with the user equipment and the unique SIM identifier; generating one of a positive response and a negative response based on the connection request, wherein the positive response is generated in an event a user profile corresponding to the user equipment is identified and the negative response is generated in an event the user profile corresponding to the user equipment is not identified, the user profile comprises the unique SIM identifier, a state information and the location area information of the subscriber identity module, and the state information indicates one of connected and detached; and restricting the at least one service to the subscriber in an event, one of: the negative response is generated based on the connection request, the state information of the subscriber identity module indicates detached, and the location area information of the subscriber identity module belongs to a forbidden list of areas.

Embodiments of the present invention may relate to a system of restricting at least one service to a subscriber based on a location area information, wherein the subscriber is associated with a unique SIM identifier of a subscriber identity module, the system comprising: a first gateway [110] configured to: receive a connection request from a user equipment [102], wherein the connection request includes at least one of a UE identifier associated with the user equipment [102] and the unique SIM identifier; an authentication server [118] configured to: receive the connection request from the first gateway [110], and generate one of a positive response and a negative response based on the connection request, wherein the positive response is generated in an event a user profile corresponding to the user equipment [102] is identified and the negative response is generated in an event the user profile corresponding to the user equipment [102] is not identified, the user profile comprises the unique SIM identifier, a state information of the subscriber identity module, and the state information indicates one of connected and detached; and a decision engine [113] configured to: receive the location area information from a second gateway [112], and restrict the at least one service to the subscriber in an event, one of: the negative response is generated based on the connection request, and the location area information of the subscriber identity module belongs to a forbidden list of areas.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Also, the embodiments shown in the figures are not to be construed as limiting the invention, but the possible variants of the method and system according to the invention are illustrated herein to highlight the advantages of the invention. It will be appreciated by those skilled in the art that disclosure of such drawings includes disclosure of electrical components or circuitry commonly used to implement such components.

DETAILED DESCRIPTION

Figure 1:
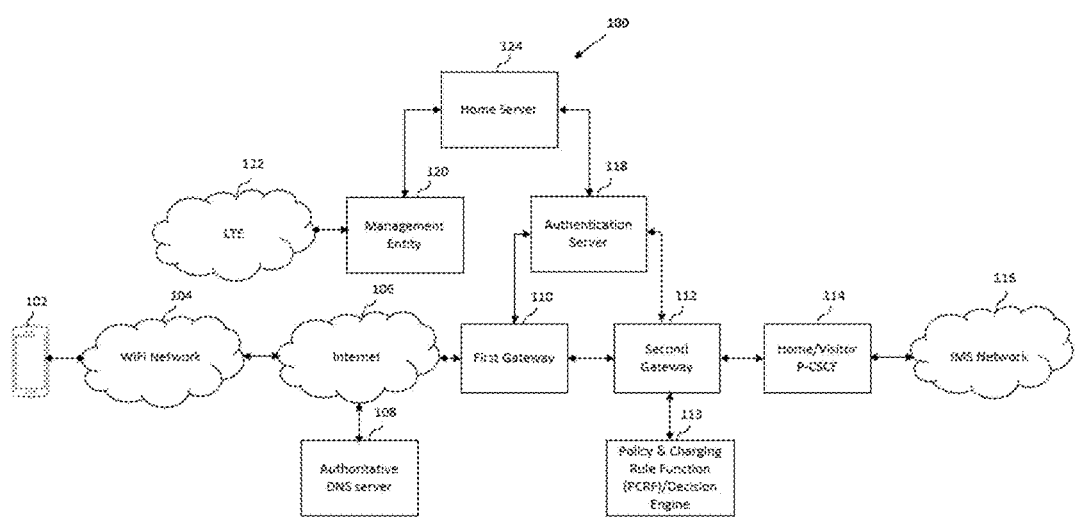
FIG. 1 illustrates a system [100] for one of providing and restricting at least one service to at least one subscriber on the basis of a current location of the at least one subscriber, in accordance with an embodiment of the present disclosure.

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present invention are described below, as illustrated in various drawings in which like reference numerals refer to the same parts throughout the different drawings.

The present invention encompasses system and method for one of providing and restricting at least one service to at least one subscriber on the basis of a current location of the at least one subscriber, wherein the at least one subscriber transmits a connection request from a user equipment to a network entity for availing the at least one service. Further, the user equipment is connected to a Wi-Fi network provided by at least one Wi-Fi access point via which the at least one subscriber avails the at least one service.

As used herein, the at least one service is a complementary technology to voice-over long term evolution (LTE) that utilizes internet-protocol (IP) multimedia subsystem technology to provide a packet-based voice service that is delivered to the at least one subscriber via the Wi-Fi network. The at least one service may include, but not limited to, voice-over Wi-Fi audio call, a voice-over Wi-Fi video call, a voice-over Wi-Fi message and a data-over Wi-Fi and any such service that is obvious to a person skilled in the art.

As used herein, the user equipment is a computing device which is connected to a cellular network using a subscriber identity module (referred hereinafter as SIM). Further, the user equipment is also capable of connecting with the Wi-Fi network provided by at least one Wi-Fi access point. The user equipment may have a processor, a display, a memory and an input means such as hard keypad and/or a soft keypad. The user equipment may include, but not limited to, a mobile phone, a tablet, a wearable device, a phablet, a personal digital assistance and any such device obvious to a person skilled in the art.

As used herein, the network entity comprises of one or more components of the cellular network. Such components include, but not limited to, a home server, a management entity, a first gateway to which the user equipment is connected, an authentication server, an authoritative DNS server, a second gateway, a policy & charging rule function (PCRF)/a decision engine, a home/visitor proxy-call session control function (P-CSCF), an IP multimedia subsystem network, and a long-term evolution (LTE) network.

As used herein, the at least one Wi-Fi access point serves the Wi-Fi network to the at least one subscriber, wherein the at least one Wi-Fi access point serves the at least subscriber using a wireless connection established between the at least subscriber and the at least one Wi-Fi access point via the Wi-Fi network.

As used herein, the Wi-Fi network is capable of providing short-range wireless communication between the at least one subscriber and the at least one Wi-Fi access point. Further, the Wi-Fi network is operable at a variable wireless frequency band such as 2.4 GHz and 5 GHz.

As illustrated in FIG. 1, the present invention illustrates a system [100] for one of providing and restricting at least one service to at least one subscriber on the basis of a current location of the at least one subscriber, in accordance with an embodiment of the present disclosure, the system [100] comprising: a user equipment [102], a Wi-Fi network [104], an internet [106], an authoritative DNS server [108], a first gateway [110], a second gateway [112], a policy & charging rule function (referred hereinafter as PCRF)/a decision engine [113], a home/visitor proxy-call session control function [114] (referred hereinafter as P-CSCF), an IP multimedia subsystem network [116] (referred hereinafter as IMS network), an authentication server [118], a management entity [120] and a long-term evolution network [122] (referred hereinafter as LTE network), and a home server [124].

The user equipment [102] may be configured to receive the cellular network using the SIM, wherein the SIM may be present inside the user equipment [102]. The user equipment [102] may be further configured to receive the Wi-Fi network [104] through the at least one Wi-Fi access point using which the user equipment [102] avails the at least one service. Moreover, the user equipment [102] may be configured to receive the internet [106] through one of the cellular network and the Wi-Fi network [104]. The user equipment [102] may have a user equipment identifier (referred hereinafter as UE identifier) that is used to identify the user equipment [102]. The UE identifier may include, but not limited to, an international user equipment identifier, a media access control address and any such identifier obvious to a person skilled in the art. Similarly, the SIM may also have a SIM identifier that uniquely identifies the SIM. The SIM identifier may include, but not limited to, an international mobile subscriber identifier, a mobile station international subscriber directory number, a unique mobile identification number, and any such identifier obvious to a person skilled in the art.

When the user equipment [102] is turned on, the user equipment [102] may detect and may get connected with the at least one Wi-Fi access point. Once, the user equipment [102] receives an IP address from the at least one Wi-Fi access, the user equipment [102] may access the internet [106]. Further, the user equipment [102] may now transmit a connection request to the first gateway [110], wherein the connection request includes at least one of the UE identifier and the SIM identifier. Further, the user equipment [102] may send a DNS query to the authoritative DNS server [108] to select the first gateway [110], wherein the selection of the first gateway [110] may be performed by one of a static selection and a dynamic selection. In the dynamic selection of the first gateway [110], the user equipment [102] may use a home-public landline mobile network (referred hereinafter as H-PLMN), a mobile country code (referred hereinafter as MCC) and a mobile network code (referred hereinafter as MNC) to form a fully qualified domain name (referred hereinafter as FQDN) of the first gateway [110]. The authoritative DNS server [108] may be configured to help the user equipment [102] to select the first gateway [110]. The authoritative DNS server [108] may be configured to receive the DNS query from the user equipment [102] for resolving the IP address of the first gateway [110]. In response to the DNS query, the authoritative DNS server [108] may resolve the first gateway [110] IP for the selection of the first gateway [110] to the user equipment. The first gateway [110] may be configured to receive the connection request from the user equipment [102] including at least one of the UE identifier and the SIM identifier. The first gateway [110], in turn, transmit the connection request to the authentication server [118], wherein the connection request may be for providing the authentication to the user equipment [102]. In a preferred embodiment, the connection request transmitted from the first gateway [110] to the authentication server [118], may be a diameter EAP request (DER). Further, the first gateway [110] may one of a home gateway and a visitor gateway.

The authentication server [118] may be configured to receive the connection request from the first gateway [110] and based on the connection request, the authentication server [118] may generate a positive response in an event the authentication server [118] may identify, from the home server [124], a user profile corresponding to the user equipment [102]. Similarly, the authentication server [118] may generate a negative response in an event the authentication server [118] may not identify, from the home server [124], a user profile corresponding to the user equipment [102]. In a preferred embodiment, such identification of the user profile from the authentication server [118] to the home server [124] may be implemented by transmitting a multi-media-auth-request (MAR) to the home server [124] for retrieving the user profile over a SWx interface, based on at least one of the UE identifier and the SIM identifier. The home server [124], in turn may generate authentication vectors for the user equipment [102] and may transmit the authentication vectors to the authentication server [118] through a multimedia-auth-answer (MAA). Based on the authentication vectors, the authentication server [118] updates the home server [124] with the address information on a server-assignment-request (SAR) for the authenticated user equipment [102]. The home server [124] may send server-assignment-answer (SAA) for user profile download to the authentication server [118]. Once the authentication server [118] retrieves the user profile, the authentication server [118] may generate one of the positive response and the negative response based on the identification of the user profile using at least one of the UE identifier and the SIM identifier.

Further, the authentication server [118] may transmit a request to the home server [124] querying for at least one of a latest/last state information and a latest/last location area information of the SIM. In a preferred embodiment, such request may be user data request (UDR) transmitted from the authentication server [118] to the home server [124]. The latest/last location area information may include the current location of the at least one subscriber.

The home server [124] may be configured to maintain one or more user profiles for each subscriber of the cellular network. The user profile includes at least one of, but not limited to, the unique SIM identifier, the latest/last state information and the latest/last location area information of the SIM. Further, the home server [124] may be configured to further transmit the request to the management entity [120], wherein the request is for at least one of the latest/last state information and the latest/last location area information of the SIM. In a preferred embodiment, the home server [124] may transmit the request to the management entity [120], wherein the request is an insert subscriber-data request (IDR) sent on S6a/S6d interface with evolved packet system (referred hereinafter as EPS) user state bit set containing the information related to the user state in the management entity [120] in an IDR flag. Moreover, the latest/last state information includes one of a connected state and a detached state of the user equipment, wherein the connected state corresponds that the user equipment is latched to the cellular network and the detached state corresponds that the user equipment is disconnected with the cellular network.

The management entity [120] may be configured to receive the request from the home server [124] for at least one of the latest/last state information and the latest/last location area information of the SIM. In response, the management entity [120] may provide at least one of the latest/last state information and the latest/last location area information of the SIM to the home server [124]. In a preferred embodiment, the response sent to the home server [124] may be insert subscriber data answer (IDA) with the EPS user state and the EPS latest/last location area information. Further, the management entity [120] may be configured to communicate with the LTE network [122].

Once the home server [124] receives the at least one of the latest/last state information and the latest/last location area information of the SIM from the management entity [120], the home server [124] may transmit the at least one of the latest/last state information and the latest/last location area information of the SIM to the authentication server [118]. In a preferred embodiment, the home server [124] may transmit the latest/last state information and/or the latest/last location area information to the authentication server [118], in the form of a user data answer (UDA) message with the EPS user state in an xml format. Based on the at least one of the user profile and the latest/last state information, the authentication server [118] may decide whether to provide or restrict the connection between the user equipment [102] and the first gateway [110] to avail the at least one service.

The PCRF/decision engine [113], connected to the second gateway [112], using a Gx interface and may be configured to restrict the at least one service to the subscriber in an event, one of: the negative response is generated based on the connection request and the latest/last location area information belongs to the forbidden list of areas.

After the authentication server [118] decides to either provide or restrict the connection between the user equipment [102] and the first gateway [110], the authentication server [118] transmits the decision to the first gateway [110]. The first gateway [110] may select the second gateway [112] and allow the user equipment [102] to avail the at least one service in an event the authentication server [118] decides to allow registration of the user equipment [102] for the at least one service, wherein the second gateway [112] may include at least one of a home packet gateway and a visitor packet gateway returned from the home server [124]. Alternatively, the authentication server [118] may restrict the user equipment [102] to avail the at least one service in an event the authentication server [118] decides to restrict the at least one service based on the at least one of the user profile and the latest/last state information of the SIM. In specific, the authentication server [118] decides to allow/provide the at least one service if at least one of the user profile corresponding to the user equipment is identified (i.e. the positive response is generated) and the latest/last state information is connected. Subsequently, the PCRF/decision engine [113] decides to restrict the at least one service if the latest/last location area information is present in the forbidden list of areas in which the at least one service is restricted to the at least one subscriber.

The home/visitor P-CSCF [114], connected to the second gateway [112], may be configured to establish a VoWiFi call session (i.e. the at least one service) for the user equipment [102] through the IMS network [116] if the PCRF/decision engine [113] decides to provide the at least one service to the at least one subscriber in an event the latest/last state information is connected.

The present invention encompasses to provide the at least one service to the subscriber using the user equipment [102] in a home location by selecting the first gateway [110], the second gateway [112] as the home PGW [112] and the home P-CSCF [114] through the IMS network [116]. The present invention further encompasses to provide the at least one service to the subscriber using the user equipment [102] in a visitor location by selecting the first gateway [110], the second gateway [112] as the visitor PGW [112] and the visitor P-CSCF [114] through the IMS network [116].

Figure 2:
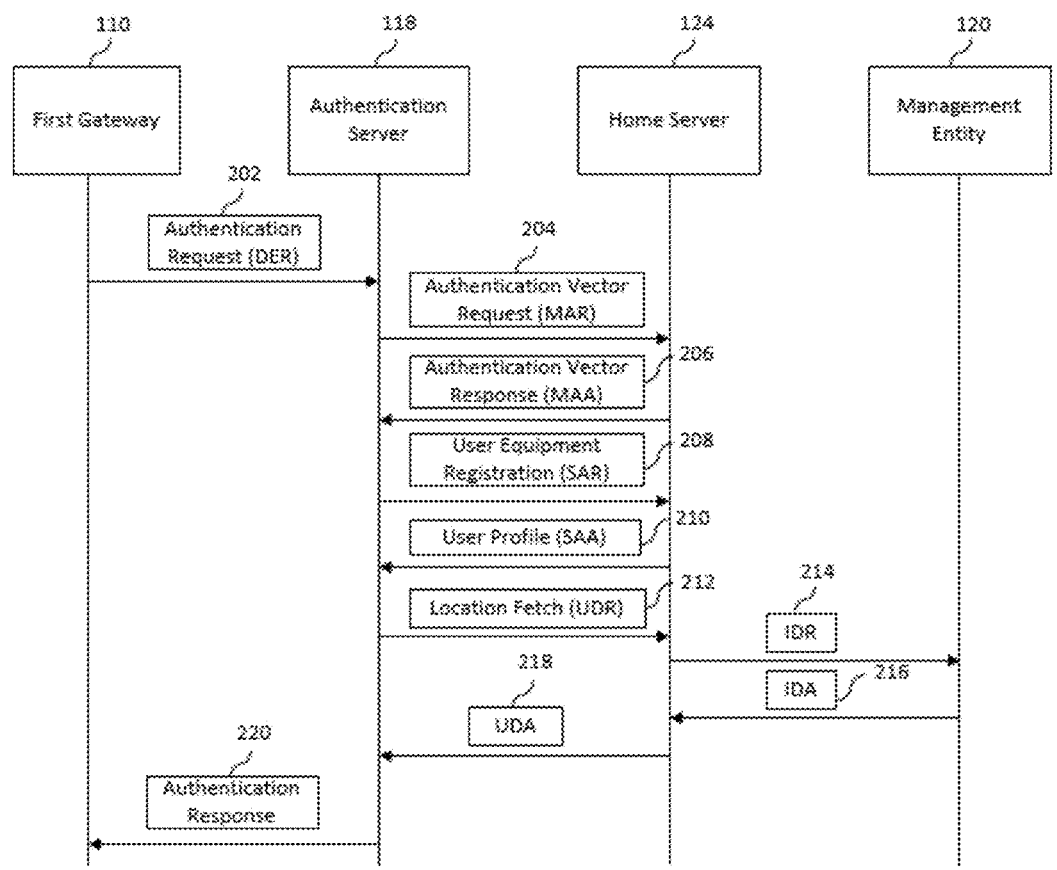
FIG. 2 illustrates an exemplary signaling flow diagram [200] for one of providing and restricting at least one service to at least one subscriber on the basis of a current location of the at least one subscriber, in accordance with an embodiment of the present disclosure.

As illustrated in FIG. 2, the present invention illustrates an exemplary signaling flow diagram [200] for one of providing and restricting the at least one service to the at least one subscriber on the basis of the current location of the at least one subscriber, in accordance with an embodiment of the present disclosure.

At step 202, the first gateway [110] may be configured to receive the connection request from the user equipment [102] including at least one of the UE identifier and the SIM identifier. The first gateway [110], in turn, transmit the connection request to the authentication server [118], wherein the connection request may be for providing the authentication to the user equipment [102]. In a preferred embodiment, the connection request transmitted from the first gateway [110] to the authentication server [118], may be a diameter EAP request (DER). Further, the first gateway [110] may be one of the home gateway and the visitor gateway. At step 204, the authentication server [118] may be configured to receive the connection request from the first gateway [110] and based on the connection request, the authentication server [118] may generate the positive response in an event the authentication server [118] may identify, from the home server [124], the user profile corresponding to the user equipment [102]. Similarly, the authentication server [118] may generate the negative response in an event the authentication server [118] may not identify, from the home server [124], the user profile corresponding to the user equipment [102]. In a preferred embodiment, such identification of the user profile from the authentication server [118] to the home server [124] may be implemented by transmitting a multimedia-auth-request (MAR) to the home server [124] for retrieving the user profile over a SWx interface.

At step 206, the home server [124], in turn may generate the authentication vectors for the user equipment [102] and may transmit the authentication vectors to the authentication server [118] through the multimedia-auth-answer (MAA).

At step 208, based on the authentication vectors, the authentication server [118] updates the home server [124] with the address information on the server-assignment-request (SAR) for the authenticated user equipment [102].

At step 210, the home server [124] may send the server-assignment-answer (SAA) for user profile download to the authentication server [118]. Once the authentication server [118] retrieves the user profile, the authentication server [118] may generate one of the positive response and the negative response based on the identification of the user profile using at least one of the UE identifier and the SIM identifier.

At step 212, the authentication server [118] may transmit the request to the home server [124] querying for at least one of the latest/last state information and the latest/last location area information of the SIM. In a preferred embodiment, such request may be the user data request (UDR) transmitted from the authentication server [118] to the home server [124]. Moreover, the latest/last location area information may include the current location of the at least one subscriber.

At step 214, the home server [124] may be configured to further transmit the request to the management entity [120], wherein the request is for at least one of the latest/last state information and the latest/last location area information of the SIM. In a preferred embodiment, the home server [124] may transmit the request to the management entity [120], wherein the request is the insert subscriber-data request (IDR) sent on the S6a/S6d interface with the EPS user state bit set in the IDR flag. Moreover, the state information includes one of the connected state and the detached state of the user equipment, wherein the connected state corresponds that the user equipment is latched to the cellular network and the detached state corresponds that the user equipment is disconnected with the cellular network.

At step 216, in response of the IDR, the management entity [120] may provide at least one of the latest/last state information and the latest/last location area information of the SIM to the home server [124]. In a preferred embodiment, the response sent to the home server [124] may be the insert subscriber data answer (IDA) with the EPS user state. Further, the management entity [120] may be configured to communicate with the LTE network [122].

At step 218, once the home server [124] receives the at least one of the latest/last state information and the latest/last location area information of the SIM from the management entity [120], the home server [124] may transmit the at least one of the latest/last state information and the latest/last location area information of the SIM to the authentication server [118]. In a preferred embodiment, the home server [124] may transmit the latest/last state information and/or the latest/last location area information to the authentication server [118], in the form of the user data answer (UDA) message with the EPS user state in the xml format.

Based on the at least one of the user profile, the latest/last state information and the latest/last location area information of the SIM, the authentication server [118] may decide to either provide or restrict the connection between the user equipment [102] and the first gateway [110] to avail the at least one service.

At step 220, after the authentication server [118] decides to one of provide and restrict the connection between the user equipment [102] and the first gateway [110], the authentication server [118] transmits the decision to the first gateway [110]. The first gateway [110] may select the second gateway [112] and allow the user equipment [102] to avail the at least one service in an event the authentication server [118] decides to provide the connection and the PCRF/decision engine [113] allows the user equipment [102] for registering the at least one service. Subsequently, the PCRF/decision engine [113] may restrict the user equipment [102] to avail the at least one service in an event the negative response is generated based on the connection request and the latest/last location area information belongs to the forbidden list of areas.

Figure 3:
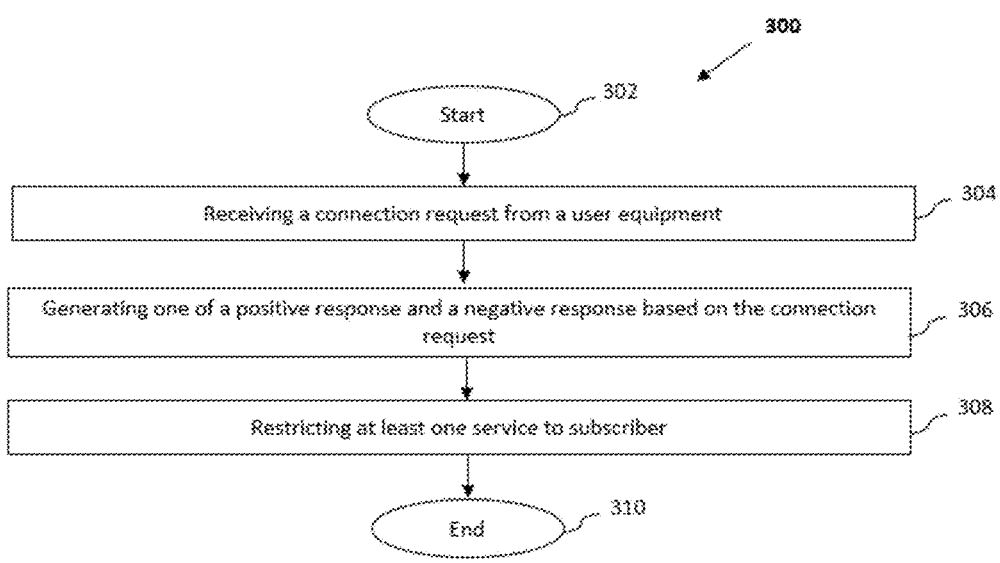
FIG. 3 illustrates an exemplary method flow diagram [300] for one of providing and restricting at least one service to at least one subscriber on the basis of a current location of the at least one subscriber, in accordance with an embodiment of the present invention.

As illustrated in FIG. 3, the present invention illustrates an exemplary method flow diagram [300] for one of providing and restricting the at least one service to the at least one subscriber on the basis of the current location of the at least one subscriber, in accordance with an embodiment of the present invention. The method flow initiates at step 302.

At step 304, the first gateway [110] receives the connection request from the user equipment [102], wherein the connection request includes at least one of the UE identifier and the SIM identifier and the connection request may be for providing the authentication to the user equipment [102].

At step 306, the authentication server [118] may receive the connection request from the first gateway [110] and based on the connection request, the authentication server [118] may generate the positive response in an event the authentication server [118] may identify, from the home server [124], the user profile corresponding to the user equipment [102]. Similarly, the authentication server [118] may generate the negative response in an event the authentication server [118] may not identify, from the home server [124], the user profile corresponding to the user equipment [102]. In a preferred embodiment, such identification of the user profile from the authentication server [118] to the home server [124] may be implemented by transmitting a multimedia-auth-request (MAR) to the home server [124] for retrieving the user profile over the SWx interface based on at least one of the UE identifier and the SIM identifier. The home server [124], in turn may generate the authentication vectors for the user equipment [102] and may transmit the authentication vectors to the authentication server [118] through the multimedia-auth-answer (MAA). Based on the authentication vectors, the authentication server [118] updates the home server [124] with the address information on the server-assignment-request (SAR) for the authenticated user equipment [102]. The home server [124] may send the server-assignment-answer (SAA) for the user profile download to the authentication server [118]. Once the authentication server [118] retrieves the user profile, the authentication server [118] may generate one of the positive response and the negative response based on the identification of the user profile. Further, the authentication server [118] may transmit the request to the home server [124] querying for at least one of the latest/last state information and the latest/last location area information of the SIM. In a preferred embodiment, such request may be the user data request (UDR) transmitted from the authentication server [118] to the home server [124]. Further, the authentication server [118] may transmit the request to the home server [124] querying for at least one of the latest/last state information and the latest/last location area information of the SIM. The home server [124] may be configured to further transmit the request to the management entity [120] and in turn, the management entity [120] may provide at least one of the latest/last state information and the latest/last location area information of the SIM to the home server [124]. Once the home server [124] receives the at least one of the latest/last state information and the latest/last location area information of the SIM from the management entity [120], the home server [124] may transmit the at least one of the latest/last state information and the latest/last location area information of the SIM to the authentication server [118]. Moreover, the latest/last location area information may include the current location of the at least one subscriber.

At step 308, based on the at least one of the user profile, the latest/last state information and the latest/last location area information of the SIM, the authentication server [118] may decide either to provide or restrict the connection between the user equipment [102] and the first gateway [110] to avail the at least one service. After the authentication server [118] decides to either provide or restrict the connection between the user equipment [102] and the first gateway [110], the authentication server [118] transmits the decision to the first gateway [110]. The first gateway [110] may select the second gateway [112] and allow the user equipment [102] to avail the at least one service in an event the authentication server [118] decides to allow the registration. Alternatively, the authentication server [118] may restrict the user equipment [102] to avail the at least one service in an event the authentication server [118] decides to restrict the registration based on the at least one of the user profile and the latest/last state information of the SIM. In specific, the authentication server [118] decides to allow/provide the at least one service if at least one of the user profile corresponding to the user equipment is identified (i.e. the positive response is generated) and the latest/last state information is connected. Subsequently, the PCRF/decision engine [113] decides to restrict the at least one service if the negative response is generated based on the connection request and the latest/last location area information belongs to the forbidden list of areas. Then, the method [300] may end at step 310.

The present invention facilitates the management entity [120] to maintain the latest/last state information of the at least one subscriber based on the connection of the user equipment [102] with the cellular network. The exemplary Table 1 defines some conditions for which state of the user equipment [102] is defined. For an instance, when the user equipment [102] is accessing internet [106] or when the user equipment [102] is in an idle state, the state of the user equipment [102] is connected i.e. the user equipment [102] is connected to the cellular network. However, in the condition of "after purge timer start and before expiry", the state of the user equipment [102] is detached i.e. the user equipment [102] is currently disconnected to the cellular network.

TABLE 1

| S. No. | Condition | IDR-Flags | EPS-User State |
|---|---|---|---|
| 1 | The at least one subscriber is enjoying internet | EPS user state request, EPS location information request | CONNECTED_REACHABLE_FOR_PAGING |
|  |  | EPS user state request, EPS location information request, current location request | CONNECTED_REACHABLE_FOR_PAGING |
| 2 | The at least one subscriber is in idle | EPS user state request, EPS location information request | CONNECTED_REACHABLE_FOR_PAGING |
|  |  | EPS user state request, EPS location information request, current location request | CONNECTED_REACHABLE_FOR_PAGING |
| 3 | After MRT timer start & before IDT timer start | EPS user state request, EPS location information request | CONNECTED_REACHABLE_FOR_PAGING |
|  |  | EPS user state request, EPS location information request, current location request | CONNECTED_REACHABLE_FOR_PAGING |
| 4 | After IDT timer start & before purge timer start | EPS user state request, EPS location information request | NETWORK_DETERMINED_NOT_REACHABLE |
|  |  | EPS user state request, EPS location information request, current location request | NETWORK_DETERMINED_NOT_REACHABLE |
| 5 | After purge timer start and before expiry | EPS user state request, EPS location information request | DETACHED |
|  |  | EPS user state request, EPS location information request, current location request | DETACHED |
| 6 | After purge timer expiry | EPS user state request, EPS location information request | ERROR_USER_UNKNOWN |

As used herein, the authoritative DNS server [108] may be a domain name server [DNS] used for resolving the IP address of the user equipment [102] and helps in identifying the home/visitor first gateway [110].

As used herein, the first gateway [110] may be a carrier-grade gateway to offer VoWiFi secure service for the subscriber/s over trusted and un-trusted Wi-Fi access points present in the HetNet.

As used herein, the second gateway [112] may be a home/visitor packet gateway that may be critical network function for the LTE network [122]. The second gateway [112] acts as the interface between the LTE network [122] and other packet data networks, such as the Internet [106] or SIP-based IMS networks [116]. Further, the second gateway [112] serves as the anchor point for the network mobility.

As used herein, the home/visitor P-CSCF [114] may be a Proxy-CSCF that may be a SIP proxy that is the first point of contact for the IMS network [116].

As used herein, the IMS network [116] may refer to a network offering multimedia services to the subscriber over the LTE network. Such multimedia services include VoWiFi services.

As used herein, the authentication server [118] may be a carrier-grade server to authenticate & authorize the subscribers as a part of data offload & trusted VoWiFi services offering.

As used herein, the management entity [120] may refer to the key control-node for the LTE network [122] and may be responsible for idle mode for the user equipment [102] performing paging and tagging procedure including retransmission.

As used herein, the LTE network [122] may refer to a fourth generation (4G) of the cellular network that provides wireless communication at a high speed.

As used herein, the home server [124] may be a master user database that supports the IMS network [116] entities that actually handle calls. Further, the home server [124] may contain the subscription-related information (subscriber/user profiles), performs authentication and authorization of the at least one subscriber.

As used herein, the PCRF/decision engine [113] may refer to a software node designated in real-time to determine policy rules in the IMS network [116]. The PCRF/decision engine [113] may also reside in the authentication server [118]. As used herein, the home location refers to a location of the at least one subscriber when the at least one subscriber is not on roaming and is connected to a gateway corresponding to the home location.

As used herein, the visitor location refers to a location of the at least one subscriber when the at least one subscriber is on roaming and is connected to a different gateway.

As used herein, the MRT timer refers to a mobile reachable timer (MRT) that starts after the state of the user equipment [102] changes from the connected state to an idle state. Further, after the MRT expires, the IDT timer starts.

As used herein, the IDT timer refers to an implicit detach timer (IDT) and after the expiry of the IDT, the user equipment [102] may be considered detached or disconnected from the cellular network.

As used herein, the purge timer refers to a time after the IDT expires and then the purge timer starts for deleting the at least one subscriber from the management entity [120].

The interface, module, and component depicted in the figures and described herein may be present in the form of a hardware, a software and a combination thereof. Connection shown between these components/module/interface in the system [100] are exemplary and any components/module/interface in the system [100] may interact with each other through various logical links and/or physical links. Further, the components/module/interface may be connected in other possible ways.

Though a limited number of the user equipment [102], the Wi-Fi network [104], the internet [106], the authoritative DNS server [108], the first gateway [110], the second gateway [112], the home/visitor P-CSCF [114], the IMS network [116], the authentication server [118], the management entity [120] and the LTE network [122], the home server [124], interfaces, modules and components, have been shown in the figures; however, it will be appreciated by those skilled in the art that the overall system [100] of the present invention encompasses any number and varied types of the entities/elements such the user equipment [102], the Wi-Fi network [104], the internet [106], the authoritative DNS server [108], the first gateway [110], the second gateway [112], the home/visitor P-CSCF [114], the IMS network [116], the authentication server [118], the management entity [120] and the LTE network [122], the home server [124], interfaces, modules and components.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

What is claimed is:

1. A method of restricting at least one service to a subscriber based on a location area information, wherein the subscriber is associated with a unique Subscriber Identity Module (SIM) identifier of a subscriber identity module, the method comprising steps of:
   receiving a connection request from a user equipment (UE), wherein the connection request includes at least one of a UE identifier associated with the user equipment and the unique SIM identifier;
   generating one of a positive response and a negative response based on the connection request, wherein the positive response is generated in an event a user profile corresponding to the user equipment is identified and the negative response is generated in an event the user profile corresponding to the user equipment is not identified,
   the user profile comprises the unique SIM identifier, a state information and the location area information of the subscriber identity module, and
   the state information indicates one of connected and detached, and
   the location area information corresponds to a last location of the SIM in an event the subscriber is latched with a cellular network: and
   restricting the at least one service to the subscriber in an event of:
   the negative response is generated based on the connection request,
   the state information of the subscriber identity module indicates detached, and
   the location area information of the subscriber identity module belongs to a forbidden list of areas in which the at least one service is restricted to the subscriber.

2. The method as claimed in claim 1, wherein the at least one service comprises one of a voice-over Wi-Fi audio call, a voice-over Wi-Fi video call, a voice-over Wi-Fi message and a data-over Wi-Fi.

3. The method as claimed in claim 1, wherein the unique SIM identifier comprises one of an international mobile subscriber identifier, a mobile station international subscriber directory number and a unique mobile identification number.

4. The method as claimed in claim 1, wherein the UE identifier comprises one of an international user equipment identifier and a media access control address.

5. The method as claimed in claim 1, wherein the connected state information corresponds that the user equipment is latched to the cellular network.

6. The method as claimed in claim 1, wherein the detached state information corresponds that the user equipment is disconnected with the cellular network.

7. a system of restricting at least one service to a subscriber based on a location area information, wherein the subscriber is associated with a unique Subscriber Identity Module (SIM) identifier of a subscriber identity module, the system comprising:
   a first gateway configured to:
   receive a connection request from a user equipment (UE), wherein the connection request includes at least one of a UE identifier associated with the user equipment and the unique SIM identifier;
   an authentication server configured to:
   receive the connection request from the first gateway, and generate one of a positive response and a negative response based on the connection request, wherein
   the positive response is generated in an event a user profile corresponding to the user equipment is identified and the negative response is generated in an event the user profile corresponding to the user equipment is not identified,
   the user profile comprises the unique SIM identifier, a state information of the subscriber identity module, the location area information corresponds to a last location of the SIM in an event the subscriber is latched with a cellular network, and
   the state information indicates one of connected and detached; and
   a decision engine configured to:
   receive the location area information from a second gateway, and restrict the at least one service to the subscriber in an event of:
   the negative response is generated based on the connection request,
   state information of the subscriber identity module indicates detached, and
   the location area information of the subscriber identity module belongs to a forbidden list of areas in which the at least one service is restricted to the subscriber.

8. The system as claimed in claim 7, wherein the at least one service comprises one of a voice-over Wi-Fi audio call, a voice-over Wi-Fi video call, a voice-over Wi-Fi message and a data-over Wi-Fi.

9. The system as claimed in claim 7, wherein the authentication server further configured to retrieve the user profile from a home server.

10. The system as claimed in claim 7, wherein the state information and the location area information are retrieved by the home server from a management entity in an event the home server receives a request from the authentication server.

11. The system as claimed in claim 7, wherein the first gateway and the user equipment are configured to communicate via at least one wireless access point.

* * * * *